United States Patent [19]

Chen

[11] Patent Number: 5,365,372

[45] Date of Patent: Nov. 15, 1994

[54] REFLECTOR ROAD SIGN

[76] Inventor: Judy Chen, 2F. No. 2, Alley 1, Lane 110, Chung-Cheng W. Rd., Chu-Pei City, Hsin-Chu Hsien, Taiwan, Prov. of China

[21] Appl. No.: 64,661

[22] Filed: May 21, 1993

[51] Int. Cl.$^5$ ............................................. G02B 5/12
[52] U.S. Cl. ..................................... 359/515; 359/551; 404/16
[58] Field of Search ...................... 359/515, 531–532, 359/551, 552, 527, 547; 116/63 C, 63 P; 404/16

[56] References Cited

U.S. PATENT DOCUMENTS 2,489,499  11/1949  Pellar ............................ 404/16
3,901,614  8/1975  Overacker ....................... 359/551

Primary Examiner—Loha Ben
Assistant Examiner—James Phan

[57] ABSTRACT

A reflector road sign includes a reflector body received within a casing, the reflector body being made of a tempered glass and having the lower half part covered with a reflector paper, the casing having a corrugated inside surface covered with a layer of bonding resin for binding the reflector body and a plurality of recesses spaced around the outside wall thereof for binding to the mounting hole on the road by a bonding resin.

7 Claims, 4 Drawing Sheets

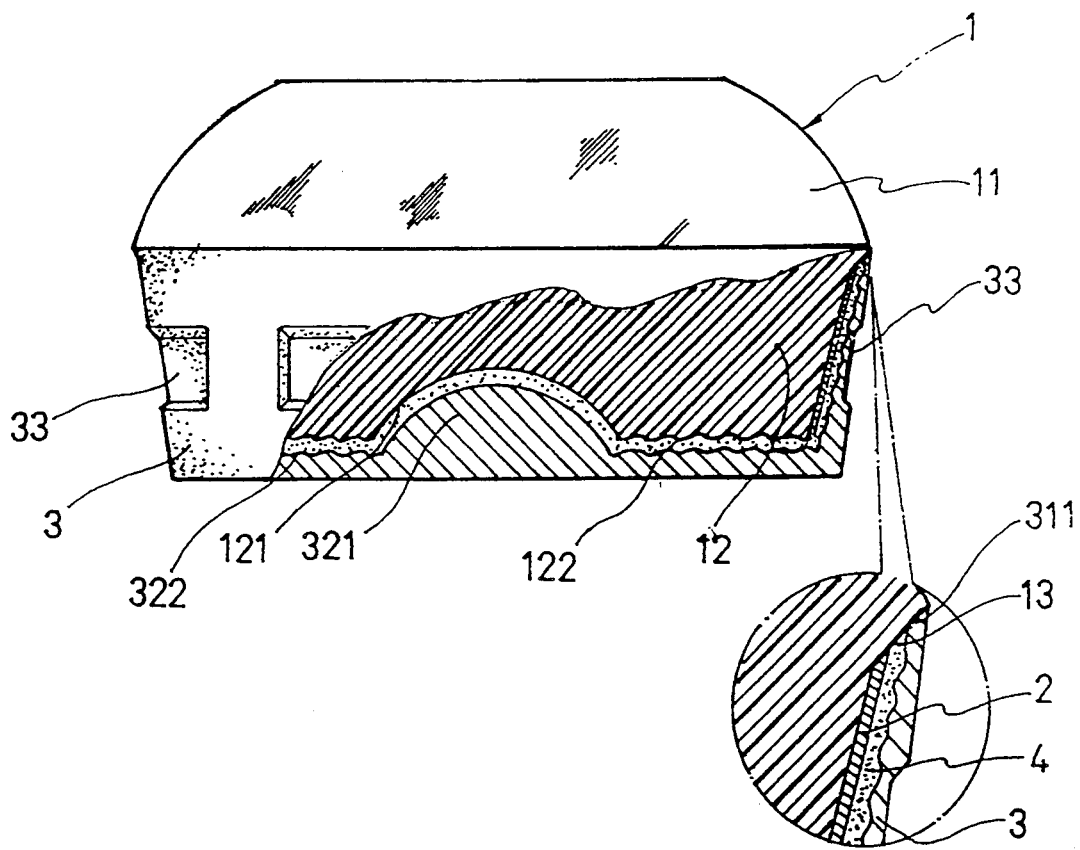
FIG 2
FIG.2A
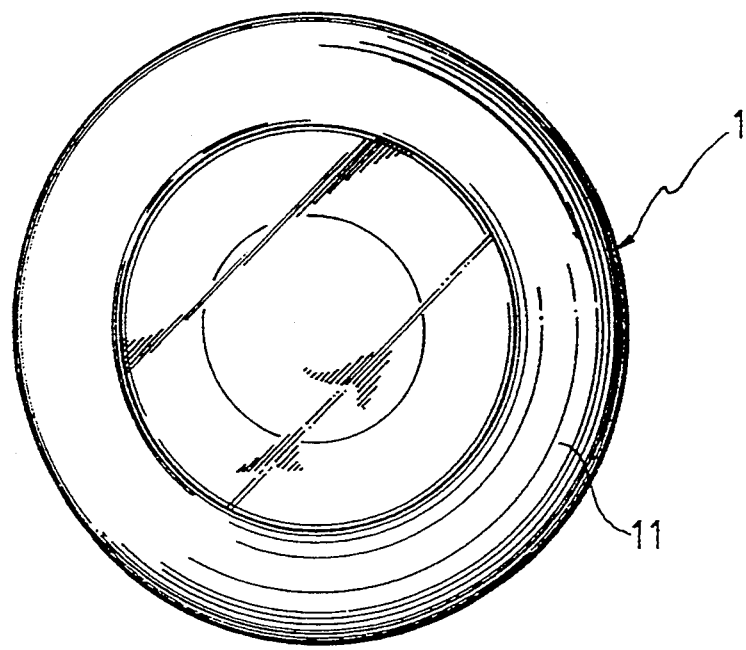
FIG 3

REFLECTOR ROAD SIGN

BACKGROUND OF THE INVENTION

The present invention relates to road signs, and more particularly to a reflector road sign which comprises a reflector body having the lower half part covered with a reflector paper, and a casing to receive the lower half part of the reflector body. The reflector body is fastened to the casing by a bonding resin.

Various reflector road signs have been disclosed, and have been widely used in a variety of roads for reflecting light and for guiding traffic in respective lanes. One of the earliest 360° angle glass reflector road sign (the so-called cat eye) which reflects light in all directions was designed by a British company about twenty to thirty years ago. This structure of reflector road sign is durable in use, and suitable for use in any road conditions. However, the effective reflecting area of this structure of reflector road sign is very small (about 6 centimeters). To increase the central reflecting area of the reflector road sign, the refractive index of the glass body of the reflector road sign must be changed relatively. Changing the refractive index of the glass body is not so easy because the angle of incidence in the horizontal direction as well as the vertical direction must be properly calculated. There is known another structure of reflector road sign comprising a casing made of a tempered glass and filled with a packing resin, and two reflectors fastened to the inside wall of a casing. This structure of reflector road sign can only reflect light in 180° angle. Further, this structure of reflector road sign is not very strong, and it may be covered with dust or turned to another direction when run over by motor vehicles. There are still other structures of reflector road signs made of plastics. However, a plastic reflector road sign wears away quickly, and may be damaged easily when run over by a motor vehicle. Further, a plastic reflector road sign has limited lateral reflecting angle. Therefore, a plastic reflector road sign is not suitable for use in turns or zigzag routes. There is still another structure of reflector road sign made of aluminum alloy. However, this structure of aluminum alloy reflector road sign is not safe in use, because it may be deformed to produce sharp angles when run over by cars, causing the car tires of the successive cars to be damaged. Therefore, an aluminum alloy reflector road sign must be replaced when deformed.

SUMMARY OF THE INVENTION

The present invention eliminates the drawbacks of the aforesaid prior art reflector road signs. A reflector road sign according to one embodiment of the present invention is comprised of a reflector body, and a casing. The reflector body has the lower half part covered with a reflector paper and then received inside the casing. The casing has a protruded block fitted into a recessed hole on the reflector body to hold it in place. A bonding resin is covered over the inside wall of the casing so that the reflector body and the casing are bounded together as the lower half part of the reflector body is inserted in the casing.

The advantages of the reflector road sign of the present invention are numerous and outlined hereinafter.

1) It is durable in use because the reflector body is made of a tempered glass.

2) It is safe in use and does not do damage to car tires because the reflector body is made of a tempered glass which does not deform when run over by motor vehicles.

3) It does not displace when installed because the bonding resin which fills in the mounting hole on the road fills into the recesses around the outside wall of the casing to tightly fasten the casing to the road in position.

4) It is easy to maintain because the reflector body has a smooth outside surface which does not adhere dust.

5) It provides a wider reflecting area and a stronger reflecting effect because a high-performance reflector paper (diamond grade reflector paper) is used.

6) It can be applied to any roads including one-way or two-way roads because the reflector paper can be made in either red, white, yellow, or with one half side in one color and the other half side in another color.

BRIEF DESCRIPTION OF THE DRAWINGS

FIG. 2 is a partial sectional view of the reflector road sign shown in FIG. 1;

FIG. 3 is a top view of the reflector road shown in FIG. 1;

DETAILED DESCRIPTION OF THE PREFERRED EMBODIMENTS

Figure 1:
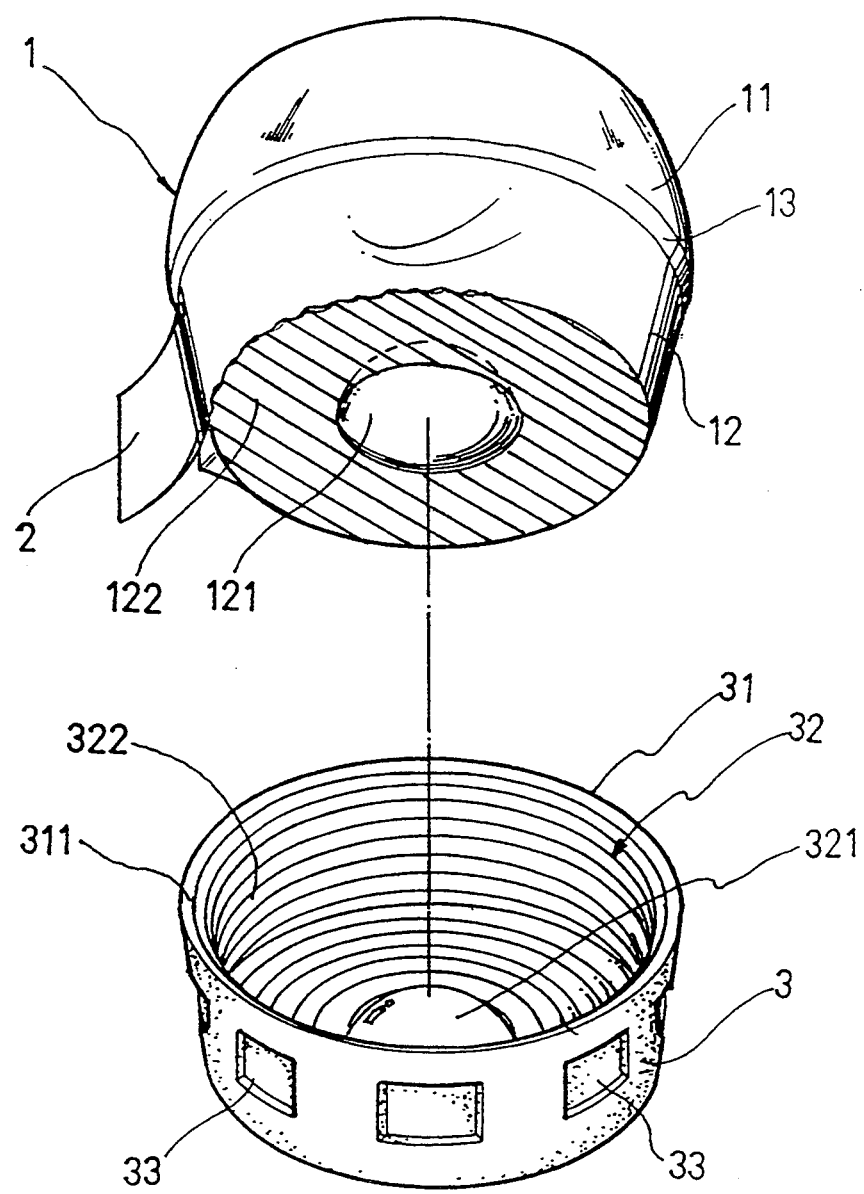
FIG. 1 is a perspective exploded view of a reflector road sign according to the preferred embodiment of the present invention.

Referring to FIGS. 1, 2 and 3, a reflector road sign in accordance with the present invention is generally comprised of a reflector body 1 and a casing 3. The reflector body 1 is made of a tempered glass consisted of a conical upper part 11 narrowing to the topmost edge thereof, a conical lower part 12 narrowing to the lowest edge thereof, and a sloping edge 13 connected between the upper part 11 and the lower part 12. The upper part 11 is relatively bigger than the lower part 12. A recessed hole 121 is disposed on the bottom surface of the lower part 12 in the center. A plurality of grooves 122 are formed on the bottom surface of the lower part 12 through the border. A reflecting paper 2 is covered over the whole periphery of the lower part 12. The reflecting paper 2 may be made in red, yellow, or white, or consisted of two halves within one in yellow and the other in white or with one in red and the other in yellow. Alternatively, the reflecting paper 2 may be covered over one half of the periphery of the lower part to produce a 180° angle of reflection. The casing 3 comprises a top opening 31, a plurality of recesses 33 spaced around the periphery thereof, and a protruded block 321 on the inside at the center of the bottom thereof, which engages into the recessed hole 121 on the lower part 12 of the reflector body 1 to hold the reflector body 1 in place. The inside wall 32 of the casing 3 is covered with a layer of resin 4 for bonding the lower part 12 of the reflector body 1. The layer of resin 4 can also absorb the force applied to the reflector body 1. A corrugations 322 may be formed on the inside wall 32 of the casing 3 so that the layer of resin 4 and the casing 3 can be firmly bound together. A sloping edge 311 is disposed on the casing 3 at the top around the opening 31. As the lower part 12 of the reflector body 1 is inserted into the casing 3, the sloping edge 311 of the casing 3 and the sloping edge 13 of the reflector body 1 are engaged and bounded together by a weather-proof bonding resin.

Figure 4:
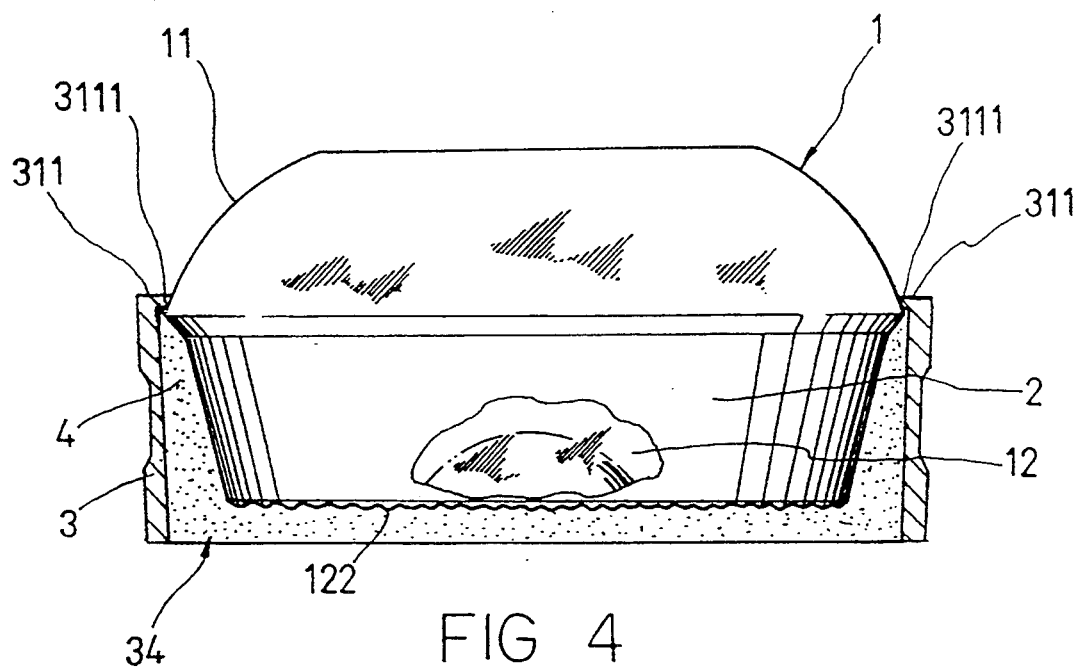
FIG. 4 illustrates an alternate form of the present invention.

Referring to FIG. 4, therein illustrated is an alternate form of the casing 3. In this alternate form, the casing 3 has an inward top flange 3111 projecting from the topmost edge 311 around the top opening 31 thereof, and a bottom opening 34 for inserting the reflector body 1 into the casing 3 from the bottom. As the reflector body 1 is inserted into the casing 3, the upper portion of the upper part 11 of the reflector body 1 projects over the casing 3, and the lower portion of the upper part 11 of the reflector body 1 is stopped inside the casing 3 by the inward top flange 3111. When connected, the casing 3 is filled with a layer of resin 4 for bonding.

Figure 5:
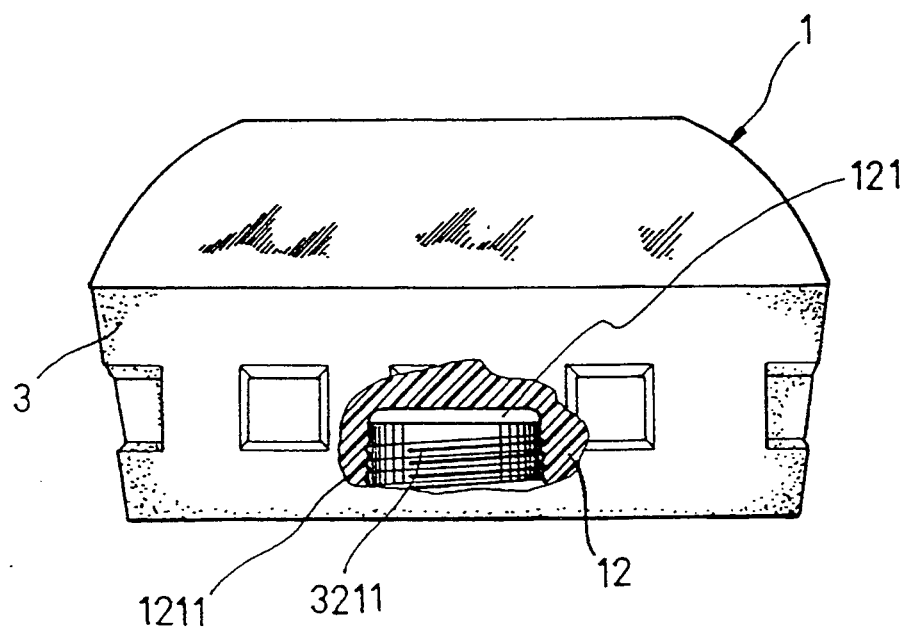
FIG. 5 illustrates another alternate form of the present invention.

Referring to FIG. 5, therein illustrated is still another alternate form of the casing 3. The casing 3 according to this alternate form is similar to the configuration shown in FIGS. 1, 2 and 3 with the exception of the inner thread 1211 on the recessed hole 121 and the outer thread 3211 on the protruded block 321. By threading the outer thread 3211 into the inner thread 1211, the connection between the reflector body 1 and the casing 3 is ensured.

Figure 6:
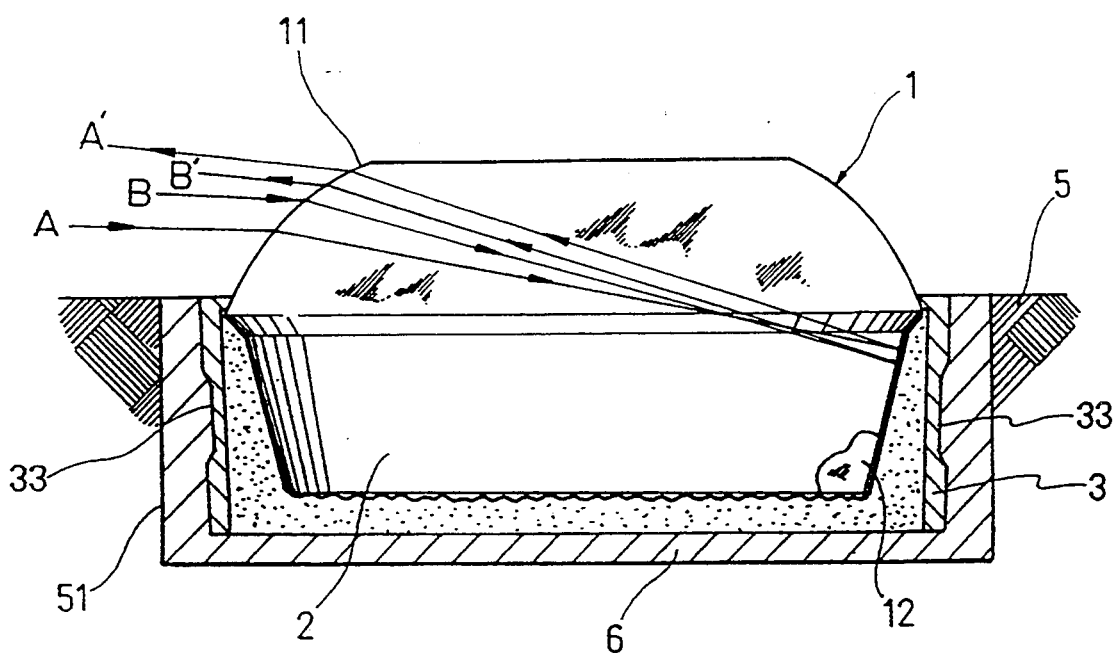
FIG. 6 is an installed view of the present invention showing the reflection of the reflecting paper.

Referring to FIG. 6, before installing in a hole 51 on the ground 5, the hole 51 is filled with a bonding agent. 6. When installed, the bonding agent 6 fills in the recesses 33 on the casing to increasing the binding power. When incident rays A;B are refracted by the upper part 11 of the reflector body 1 toward the lower part 12 of the reflector body 1, the reflector paper 2 reflects the rays and sends reflected rays A';B' out of upper part 11 of the reflector body 1. The following table shows a performance comparison between the reflector road sign of the present invention and the reflector road signs of the prior art.

lowest edge thereof, and a sloping edge connected between said upper part and said lower part, said lower part having a center recessed hole on a corrugated bottom surface thereof;
a reflecting paper covered around the periphery of said lower part of said reflector body;
a casing made to receive said reflector body, said casing comprising a top opening, through which said lower part of said reflector body inserts into said casing, a protruded block on the inside inserted into said recessed hole on said lower part of said reflector body, a top sloping edge around said top opening engaged with the sloping edge on said reflector body, and
a layer of bonding resin covered over the inside wall of said casing for binding said casing and said lower part of said reflector body together.

2. The reflector road sign according to claim 1 wherein said recessed hole of said lower part of said reflector body has an inner thread, and said protruded block of said casing has an outer thread meshed with the inner thread on said lower part of said reflector body.

3. The reflector road sign according to claim 1 wherein said casing has corrugations on the inside wall thereof.

4. The reflector road sign according to claim 1 wherein said casing has recessed holes spaced around the outside wall thereof.

5. The reflector road sign according to claim 1 wherein said reelecting paper covers one half side of said lower part of said reflector body.

6. The reflector road sign according to claim 1 wherein said reflecting paper is comprised of two equal halves in different colors respectively covered on either half side of said lower part of said reflector body.

7. A reflector road sign comprising:

| TYPE PERFORMANCE | THE INVENTION | CAT EYE REFLECTOR ROAD SIGN (360°) | CAT EYE REFLECTOR ROAD SIGN (180°) | PLASTIC REFLECTOR ROAD SIGN | ALUMINUM ALLOY REFLECTOR ROAD SIGN |
| --- | --- | --- | --- | --- | --- |
| EFFECTIVE ANGLE OF REFLECTION | ⊙ | ⊙ | ○ | △ | △ |
| REFLECTIVE POWER | ⊙ | ○ | ⊙ | ⊙ | △ |
| REFLECTIVE AREA | ⊙ | ⊙ | ○ | ⊙ | ⊙ |
| STRUCTURAL STRENGTH | ⊙ | ⊙ | ○ | △ | ○ |
| DURABILITY | ○ | ○ | △ | X | X |
| GROUND BINDING POWER | ⊙ | ⊙ | ○ | X | △ |
| SAFETY | ⊙ | ⊙ | ○ | ○ | X |
| MAINTENANCE REQUIREMENT | NO | NO | YES | YES | YES |
| APPLICABILITY TO WHITE TRAFFIC LANE | ⊙ | ⊙ | ○ | △ | X |
| APPLICABILITY TO DANGEROUS BENDS | ⊙ | ⊙ | △ | X | X |
| ECONOMY | ⊙ | ⊙ | ○ | △ | △ |

REMARK
⊙: EXCELLENT
○: GOOD
△: REGULAR
X: POOR

What is claimed is:
1. A reflector road sign comprising:
a reflector body made of a tempered glass consisted of a conical upper part narrowing to the topmost edge thereof, a conical lower part narrowing to the a reflector body made of a tempered glass consisted of a conical upper part narrowing to the topmost edge thereof, a conical lower part narrowing to the lowest edge thereof, and a sloping edge connected between said upper part and said lower part;

a reflecting paper covered around the periphery of said lower part of said reflector body;

a casing made to receive said reflector body, said casing comprising a top opening and a bottom opening on two opposite ends thereof communicated with each other, and an inward flange projecting inwards around said top opening and stopped against the lower portion of said upper part of said reflector body; and a layer of bonding resin covered over the inside wall of said casing for binding said casing and said lower part of said reflector body together.

* * * * *